United States Patent [19]
Bowerman

[11] Patent Number: 5,773,783
[45] Date of Patent: Jun. 30, 1998

[54] DOUBLE SKIN COMPOSITE STRUCTURES AND METHODS OF PRODUCING SUCH STRUCTURES

[75] Inventor: Hugh Gordan Bowerman, Woking, England

[73] Assignee: British Steel plc, Woking, England

[21] Appl. No.: 716,333

[22] PCT Filed: Mar. 31, 1995

[86] PCT No.: PCT/GB95/00755

§ 371 Date: Feb. 14, 1997

§ 102(e) Date: Feb. 14, 1997

[87] PCT Pub. No.: WO95/26854

PCT Pub. Date: Oct. 12, 1995

[30] Foreign Application Priority Data

Mar. 31, 1994 [GB] United Kingdom ................ 9406439.1

[51] Int. Cl.[6] .................................................. B23K 11/00
[52] U.S. Cl. ...................................................... 219/117.1
[58] Field of Search ................................. 219/117.1, 118, 219/78.01, 83, 91.2, 91.21, 91.22, 80; 29/460

[56] References Cited

U.S. PATENT DOCUMENTS

| 4,614,013 | 9/1986 | Stevenson | 29/155 R |
| 4,724,293 | 2/1988 | Bertels | 219/78.12 |
| 5,398,470 | 3/1995 | Ritter et al. | 52/309.11 |
| 5,624,622 | 4/1997 | Boyce et al. | 264/258 |

*Primary Examiner*—Adolf Berhane
*Attorney, Agent, or Firm*—Kinney & Lange, P.A.

[57] ABSTRACT

A method of sequentially welding a plurality of metallic cross-members in spaced rows to facing plates of a double skin composite panel includes the steps of causing the plates to separate to enable each cross-member in turn to be positioned therebetween, applying clamping forces to both facing plates to align the plates approximately normal to the cross-members to be welded thereto, subjecting the inner faces between the cross-member and the facing plates to a welding operation, and, at the same time, controlling the force transferred between the cross-member and the facing plates.

18 Claims, 8 Drawing Sheets

DOUBLE SKIN COMPOSITE STRUCTURES AND METHODS OF PRODUCING SUCH STRUCTURES

This invention relates to double skin composite structures which comprise a layer of a filler material (usually a cementitious material such as concrete) faced with plates (usually carbon steel) and methods of producing the same. A lighter filler material such as filled synthetic resin may be employed for certain applications. More especially, but not exclusively, the invention concerns the production of double skin composite panels which can be assembled to produce double skin composite structures, each panel comprising two steel facing plates positioned one on each side of a layer of concrete and connected thereto by cross members which extend generally normal to the facing plates and are attached at their ends to both facing plates.

Double skin composite structures exhibit similar characteristics to those of reinforced concrete structures and are advantageous in that the steel facing plates act as reinforcements to enable the required strength characteristics to be achieved with structures of overall depth less than those of reinforced concrete. High reinforcement ratios are possible and the steel plates act as permanent shuttering for the central concrete layer.

It has been established that the attachment of the steel facing plates to the concrete must be adequate to ensure that shear forces are effectively transferred and for this purpose it has previously been proposed to employ cross members in the form of steel webs which span and are welded to the inner faces of the steel plates and/or shear studs which are welded to the inner face of one steel plate and are embedded within the concrete of the structure. Such structures are disclosed in GB-A-2136032, GB-A-2136033 and GB-A-2258669.

Applicants have established that the spacing and number of cross members in double skin composite structures is important inter alia to avoid unwanted structural changes during concrete pouring and to prevent buckling of the steel plates away from the intervening concrete during use. The consequent need to employ a large number of cross members in a multiplicity of spaced rows means that welding is both difficult and expensive to achieve particularly when the spacing between the plates is small, that is to say between 30mm and 800mm. Also, any method of construction which generates a significant heat output can result in distortion of the assembled panel which may create problems during later assembly.

To minimise the cost of composite structures, it is necessary to make the individual facing plates as large in area as possible, thus minimising welding around the edges but increasing problems associated with welding individual cross-members to the internal surfaces of the panels.

U.S. Pat. No. 3,676,631 discloses a resistance welding machine for welding transverse rungs between longitudinal rods to form steel reinforcement. Whereas such a machine would be adequate where a single row of cross members is required on narrow plates, it could not operate to position and weld a multiplicity of cross members in spaced rows to facing plates of a double skin composite structure.

The present invention sets out to provide methods of producing double skin composite panels as discussed above and double skin composite panels produced thereby.

According to the present invention in one aspect there is provided a method of sequentially welding a plurality of metallic cross-members in spaced rows to facing plates of a double skin composite panel with the longitudinal axis of each cross-member aligned substantially normal to the facing plates, the method including the steps of causing the facing plates to separate, positioning each cross-member in turn between the facing plates, applying a controlled clamping force to the inner and outer surfaces of each facing plate thereby to hold each facing plate substantially normal to the longitudinal axis of each cross-member and to place the inner surface of each facing plate in intimate contact with the respective end of a cross-member to be welded thereto, subjecting the interfaces between the ends of the cross-member and the facing plates to a welding operation, and controlling the force applied through the facing plates to each end of the cross-member during the course of the welding operation.

The transferred force may be preset and maintained substantially constant during a welding operation. Alternatively, the force may be varied during the welding operation.

Clamping forces may be applied by a bearing plate movable into contact with the outer surface of one facing plate at a location co-incident with the position of one end of a cross-member located between the facing plates. Two bearing plates may be provided, one in contact with the outer surface of each facing plate at a location co-incident with the position of the respective end of a cross-member located between the facing plates. The clamping forces may be applied to the inner and outer surfaces of each clamping plate.

The invention will now be described by way of example only with reference to the accompanying diagrammatic drawings, in which.

Figure 1:
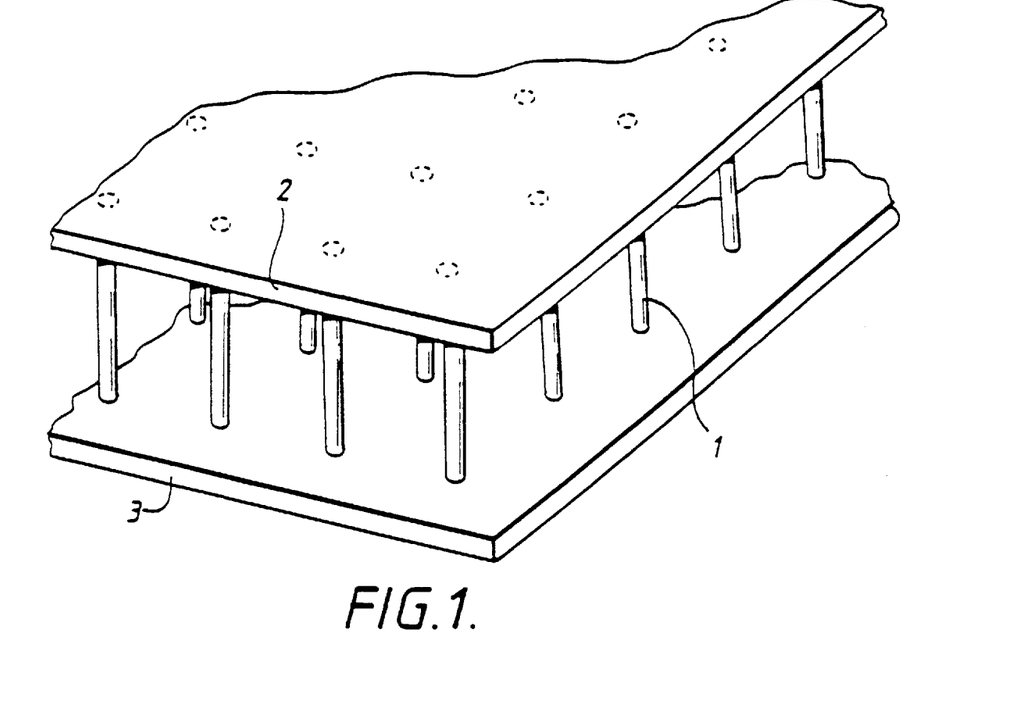
FIG. 1 is a perspective view of a double skin composite panel in accordance with the invention.
Figure 2:
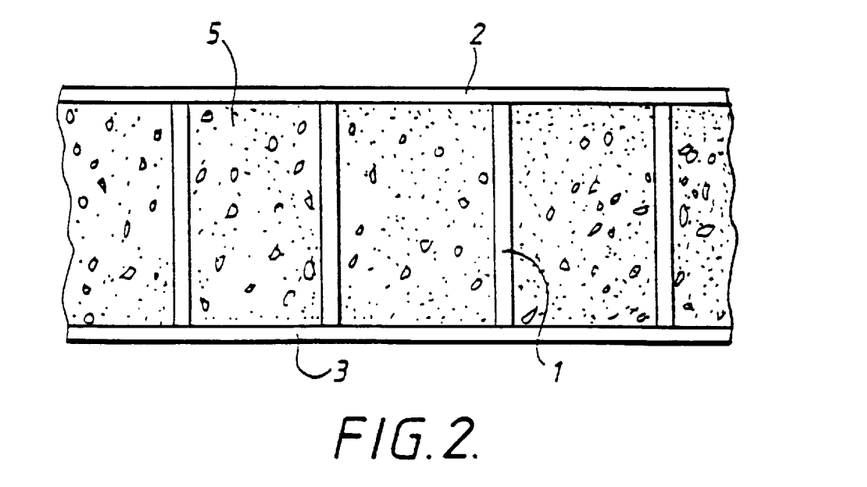
FIG. 2 is a side view of the panel shown in FIG. 1.

The double skin composite structure illustrated in FIGS. 1 and 2 comprises a plurality of spaced cross-members 1 each welded to the internal surfaces of metal facing plates 2, 3 of a double skin composite panel. The cross-members 1 are positioned normal to the facing plates and may comprise bars, tubes, studs or the like. For the sake of simplicity, these cross-members 1 will hereinafter be referred to as "bars". The way in which the welds between each bar 1 and the plates 2,3 are effected will be described below. To complete the structure the void between the plates is filled with normal or lightweight concrete 5. In doing so, the bars 1 become embedded in the concrete.

Typically, the plates are produced from a carbon steel and their thickness typically lies within the range 2mm to 32mm. The separation between the face plates 2, 3 is typically between 30mm to 100mm and 800mm. As shown the bars 1 are produced from a carbon steel and are welded to the plates 2,3 at centres forming a predetermined pattern, the spacing between neighbouring cross-members being typically between 10 and 80 times the plate thickness. For production efficiency, each plate is typically of a width between 1m and 3.5 and a length of between 2m and 18m. Thus, a large number of rows of cross-members need to be welded between the plates.

As illustrated, the bars 1 are welded between flat plates. On occasions, however, it is necessary to weld bars between plates having a single curvature.

It will be appreciated that the completed welds will, in use of the welded structure, be subjected to cyclic loading and hence fatigue. They must, therefore, be of the highest quality with minimum associated heat affected zones. It is also recognised that many welding processes suited for automation will reduce the length of bar which means that the initial bar length must necessarily be larger than the final bar length. Also, weld quality must be controlled since subsequent inspection and repair will not, on many occasions, be possible. After welding, the face plates 2,3 need to be at a pre-specified distance apart to avoid problems during assembly of the individual panels into a double skin composite structure.

The way in which the bars are located and welded to the plates will now be described.

Figure 3:
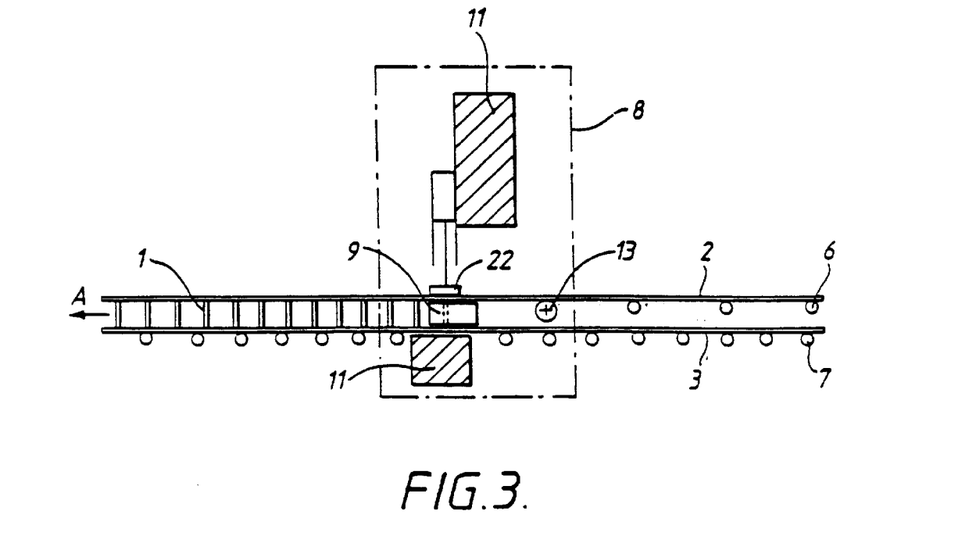
FIGS. 3, 4 and 5 are side and plan schematic views (two) of apparatus for producing the panels of FIGS. 1 and 2.
Figure 4:
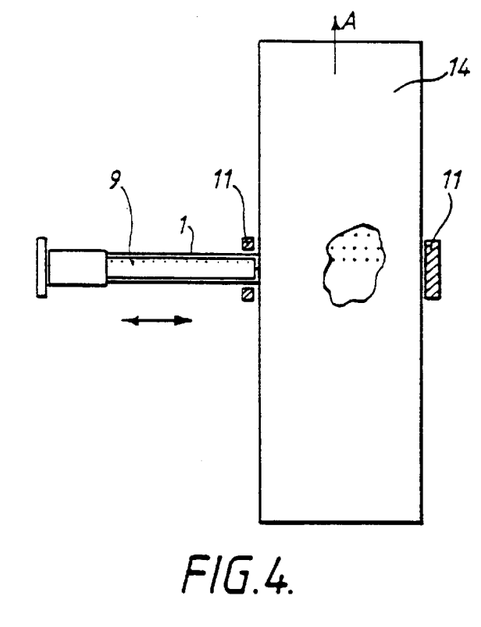
Figure 5:
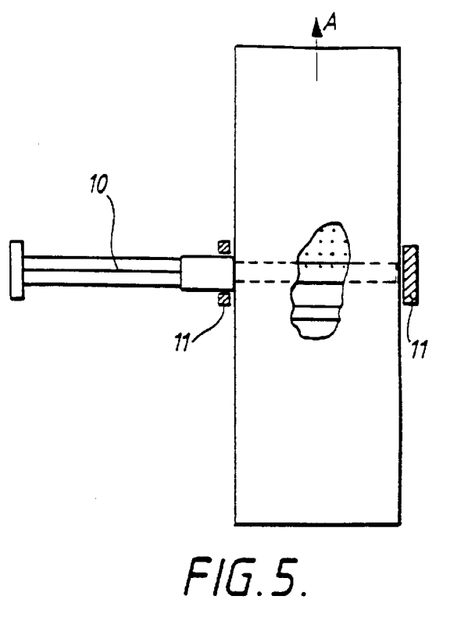

As shown in FIGS. 3 to 5, the plates 2, 3 are firstly placed on vertically spaced support rollers 6, 7 respectively and are advanced automatically in the direction of arrow "A" towards and away from a welding machine 8. The welding machine 8 comprises a tool carrier 9 which slides on a linear guide system 10 such that the tool carrier can be loaded between the plates. FIG. 4 shows the tool carrier loaded with bars 1 immediately before being slid into position between the plates 2,3 and FIG. 5 shows the tool carrier sited between the face plates 2,3. In order to ensure that the various parts of the welding machine are accurately referenced to each other and to the plates, a rigid frame 11 is provided.

As the plates 2,3 enter the welding machine 8, so the tool carrier 9 is slid between the plates. The tool carrier holds one row of metal bars 1 mounted in the welding tools.

Because the length of each metal bar 1 is either equal to or greater than the distance between the plates 2,3, a roller 13 is provided, positioned within the machine 8 but in advance of the tool carrier, the roller 13 being raised to increase the gap between the plates. Once the tool carrier 9 is positioned between the plates, the roller 13 is lowered so that the upper plate 2 rests on the bars 1. A bearing plate 22 cooperates with the frame 11 to align and hold the plates 2,3 normal to the bars 1. The position of the bearing plate 22 is controlled by a hydraulic system to be described below with reference to FIGS. 7 and 8. The bars are therefore trapped between the plates ready for welding, the tool carrier ensuring that they are properly spaced one with respect to the others. The roller 13 and associated control system are illustrated in greater detail in FIGS. 6 to 8.

Figure 7:
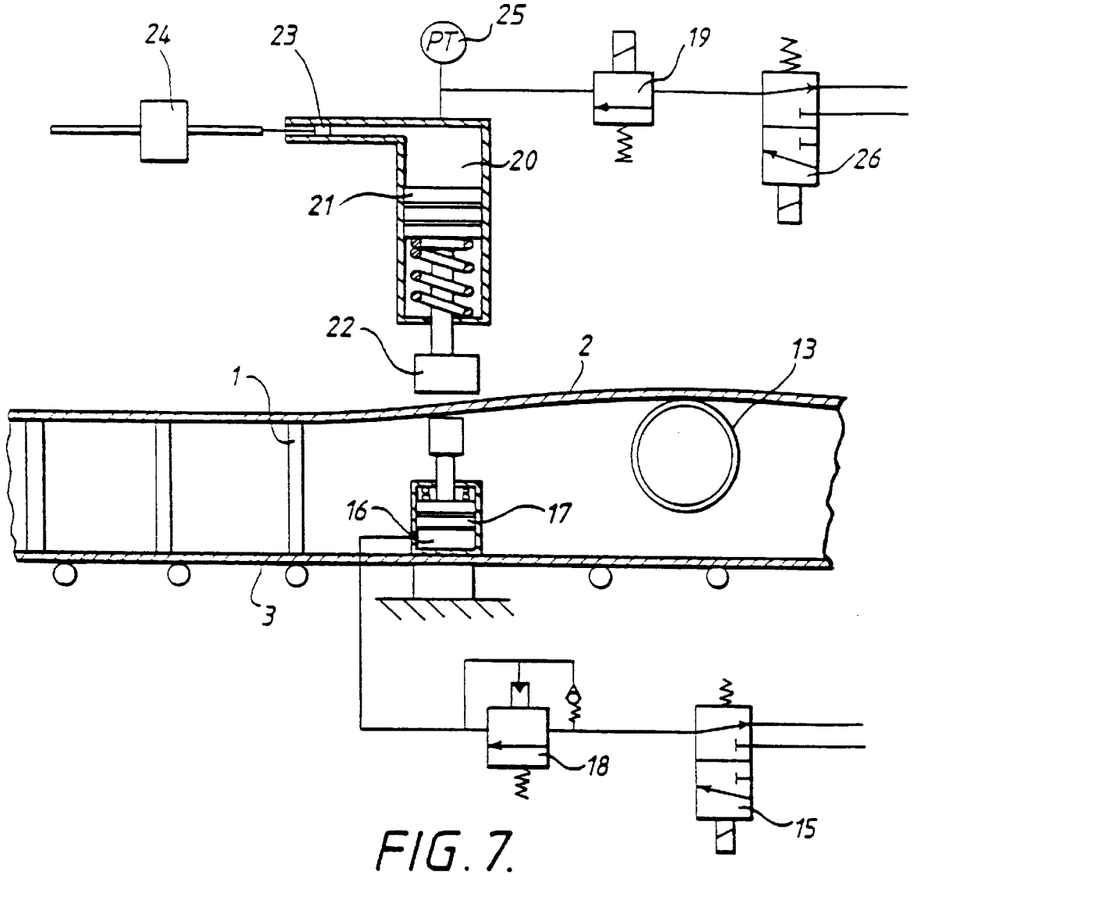
FIG. 7 is a schematic view of control apparatus used in the production of double skin composite panels in accordance with the invention.
Figure 8:
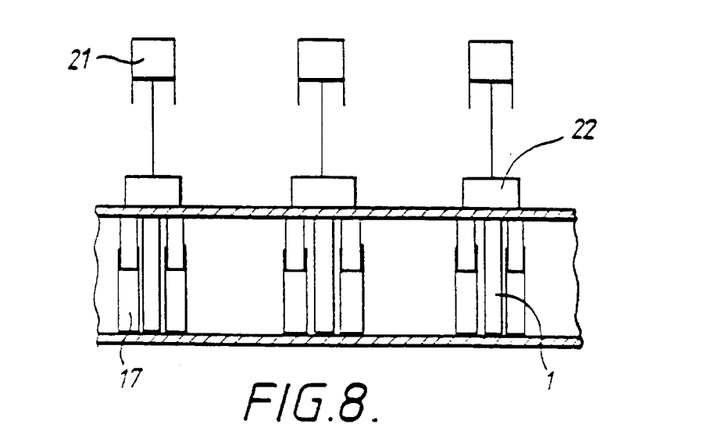
FIG. 8 is a detail of the control apparatus illustrated in FIG. 7.

As mentioned above, the roller 13 is raised to enable bars 1 whose length is equal to or greater than the distance between the plates 1, 2 to be positioned between the plates ready for welding. When the roller 13 is in its raised position a three-way, two-position solenoid valve 15 is energised thereby connecting a cylinder 16 housing a spring biassed piston 17 to a supply of hydraulic fluid. A pressure regulator 18 is provided to enable the piston 17 to lift the upper plate 2 clear of the bars to be welded but without creating yield stresses in the plate 2. A second three-way, two-position solenoid valve 26 connects the cylinder 20 of a secured piston 21 to the hydraulic supply and operates to force the bearing plate 22 onto the upper facing plate 2. Any gaps existing between the bars to be welded and the facing plate 2 will therefore be closed. The area, and therefore the force exerted by the piston 21, is greater than the area and consequent force of the piston 17 thereby causing the piston 17 to move downwardly to return hydraulic fluid to the supply. The cylinder 20 includes a control piston 23 which is moved to its start position by a linear actuator 24. An isolation valve 19 is energised to close, thereby isolating a volume of fluid within the cylinder 20. The linear actuator 24 initially moves the control piston 23 into the cylinder 20 until the drive stalls. The linear actuator then automatically withdraws the control piston 23. As the piston 23 is withdrawn a pressure transducer 25 records the variation in pressure against the position of the linear actuator 24. This results a graph similar to that shown in FIG. 6.

Figure 6:
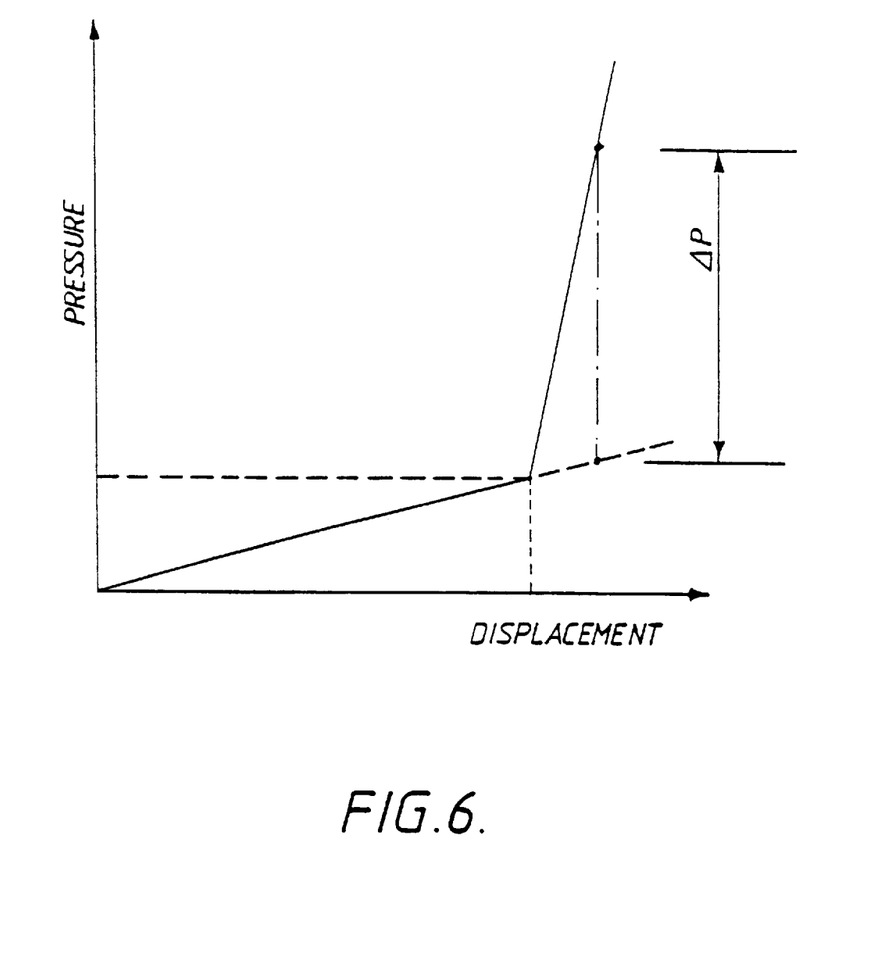
FIG. 6 is a graph of pressure against displacement.

As will be seen the graph of FIG. 6 has two distinct gradients. The shallow gradient corresponds to a gap existing between the bars 1 to be welded and the upper face plate 2. The steep gradient occurs when this gap is closed. The graph can be used to determine the linear actuator displacement at which the gap closes.

Since there is a known relationship between the displacement of control piston 23 and the movement of piston 21, this relationship can be used to control and monitor vertical movements of the plate 2. Changes in fluid volume of cylinder 20 as a result of bulk modulus effects are compensated from a knowledge of volume and pressure.

The graph of FIG. 6 also enables the force acting between plate 2 and bar 1 to be accurately determined because the shallow gradient on the graph represents the stiffness of the facing plates when pushed apart. Thus, if the displacement of the facing plates is known, its contribution to the force balance is known. Balancing forces applied to the system, the force between bar and plate is given as the plate force defined above plus the force from piston 22 minus the force from the internal piston 16.

Once all the bars loaded into the tool carrier have been welded to the plates 2,3, the welded structure 14 is advanced a distance corresponding to the desired spacing between lines of bars 1 and the above procedure repeated. Those bars 1 now welded to the plates 2, 3 move with the welded structure 14 thus removing them from the tool carrier 9. The tool carrier can then be withdrawn and loaded either manually or automatically with new bars.

The procedure described above is repeated until bars 1 have been welded over the complete plate area. At this stage the welded structure 14 is removed from the machine 8.

Figures 9, 10:
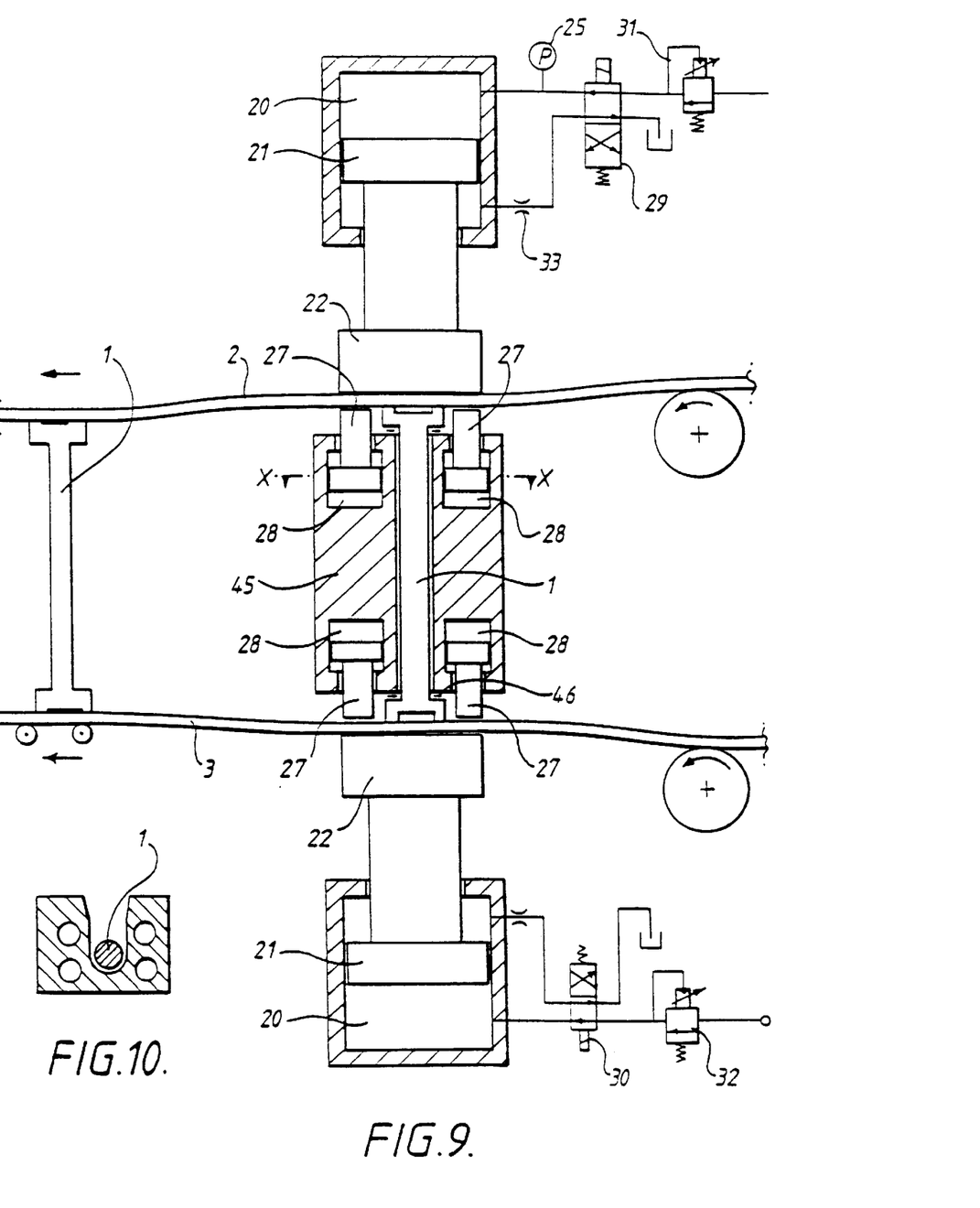
FIG. 9 illustrates alternative control apparatus in accordance with the invention.
FIG. 10 is a section taken along line X—X of FIG. 9.

Turning now to FIGS. 9 and 10 (in which like integers to those described above have been given the same reference numerals), the control system illustrated comprises a plurality of double acting pistons 27 acting in cylinders 28. Eight pistons have been illustrated; other numbers of pistons may, however, be employed. Four pistons are arranged to push in an upwards direction and four pistons to push in a downwards direction. The pistons 27 are arranged about the bar 1 as shown in FIG. 10. Spacing of the pistons 27 is selected to ensure that their projected contact surfaces with the facing plates 2, 3 lie entirely within the footprints of upper and lower bearing plates 22. The bearing plates 22 are attached to pistons 21 which may be moved upwardly and downwardly within cylinders 20 under the control of solenoid controlled four way two position hydraulic valves 29, 30. Both valves 29 and 30 are operated simultaneously to ensure that the bearing plates 22 contact the plates 2,3 at approximately the same time. Electrically variable pressure regulators 31,32 are provided initially to reduce the pressures within the cylinders 20 to ensure that the bearing plates 22 exert minimum force on the plates 2,3 until both bearing plates are in contact. Pressure regulators 31,32 are then used to increase the cylinder pressure to clamp the face plates 2,3 between the bar 1 and the bearing plates 22. The bearing plates 22 remain horizontal. The speed of advance of each piston is limited by orifice 33, pressure transducer 25 acting to monitor the actual cylinder pressure and hence the force applied.

With the plates 2,3 clamped between the bar 1 and the bearing plates 22, hydraulic pressure is increased to extend pistons 27 out of their cylinders 28 by energising a four-way, two-position hydraulic control valve 34. Variable pressure regulator 35 is used to control the force exerted by the pistons 27 such that it is less than the force exerted by piston 21. However, sufficient force is applied to bring the facing plates 2, 3 into intimate contact with the bearing plates 22. Once contact has been achieved the bank of isolation valves 36 are closed, trapping a fixed volume of fluid in each of the eight now separate hydraulic circuits.

The facing plates 2, 3 can be moved up and down by extending and retracting double acting piston 37 (see FIG. 11) within cylinder 38. This piston acts to move eight separate pistons 39 an identical distance within their cylinders 40. Each cylinder 40 is connected hydraulically to one of the cylinders 28. A movement..of piston 37 must therefore result in a movement of piston 27.

Figure 11:
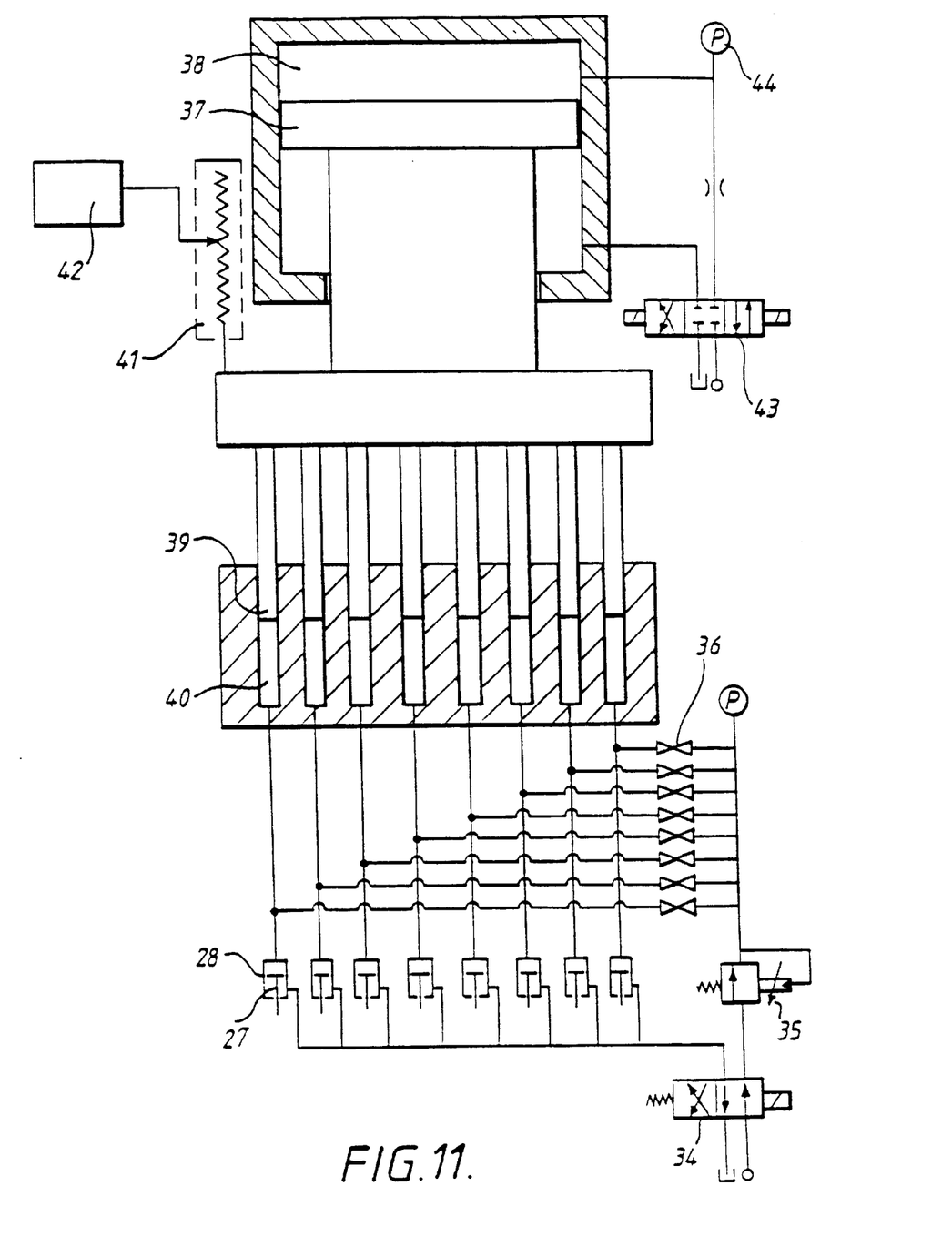
FIG. 11 further illustrates the control apparatus illustrated in FIG. 9.

The movement of piston 37, and hence pistons 27, is controlled by a displacement transducer 41. This sends a signal to a control box 42 which operates a four-way, three-position control valve 43. The pistons 27 can thus be extended and retracted as required.

The force acting on the bar is monitored by multiplying the pressure measured at transducer 44 by half the area of piston 37 and subtracting this from the pressure at transducer 25 multiplied by the area of piston 21. It is thus possible to generate a graph similar to that shown in FIG. 6, and hence determine what position of piston 37 corresponds to just establishing contact.

During welding, pistons 27 are retracted at a pre-defined rate. In the event that the bar shortens equally at each end, there will be no force transfer to tool block 45. In the event that the bar shortens to a greater extent at one end than the other, then the end flange of the bar 1 bears on bearing 46. The bar is therefore stopped from moving axially relative to tool block 45 with a near equal displacement occurring at each end. A nominal clearance is required between the bar 1 and the bearing 46.

Figure 12:
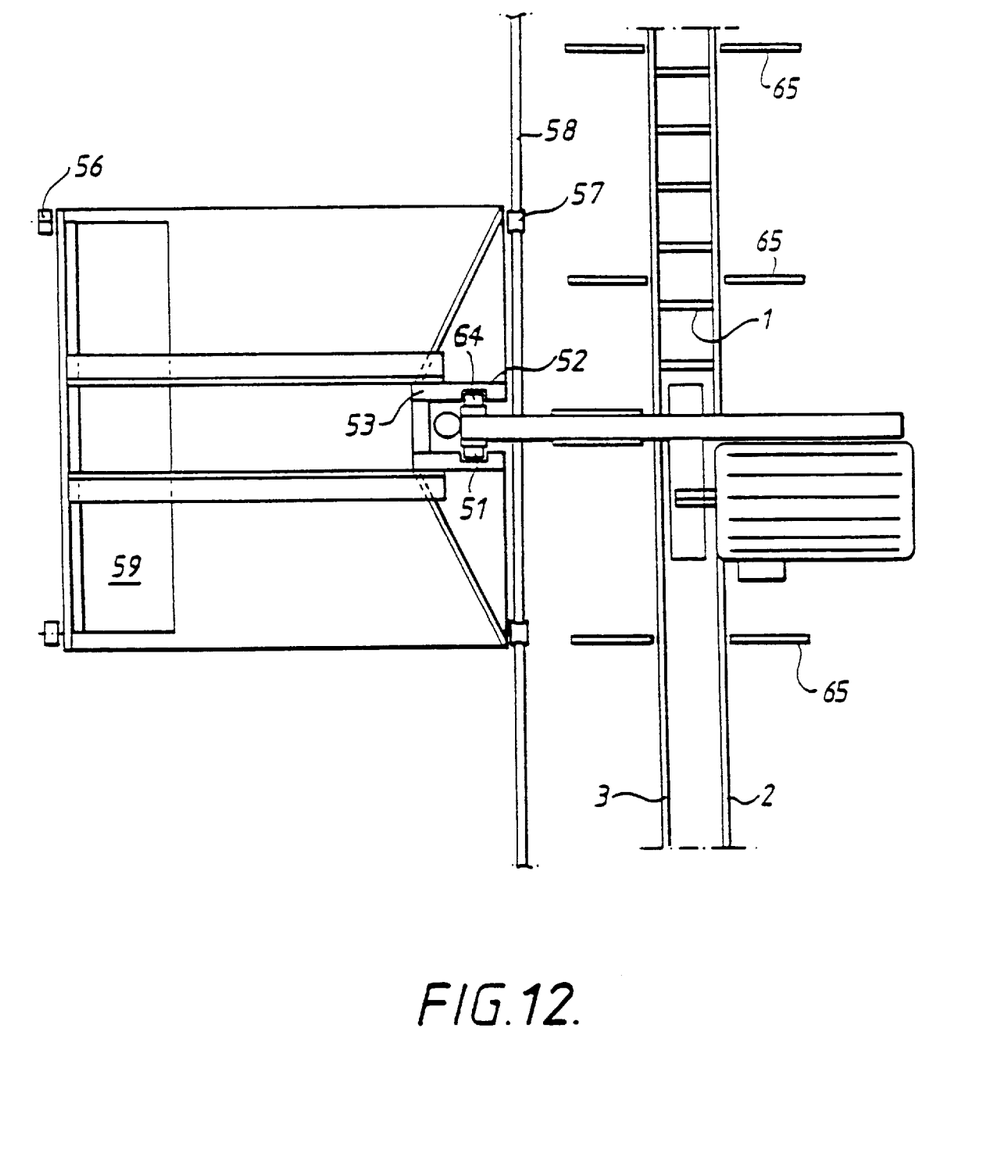
FIG. 12 is a plan view from above of alternative apparatus in accordance with the invention.
Figure 13:
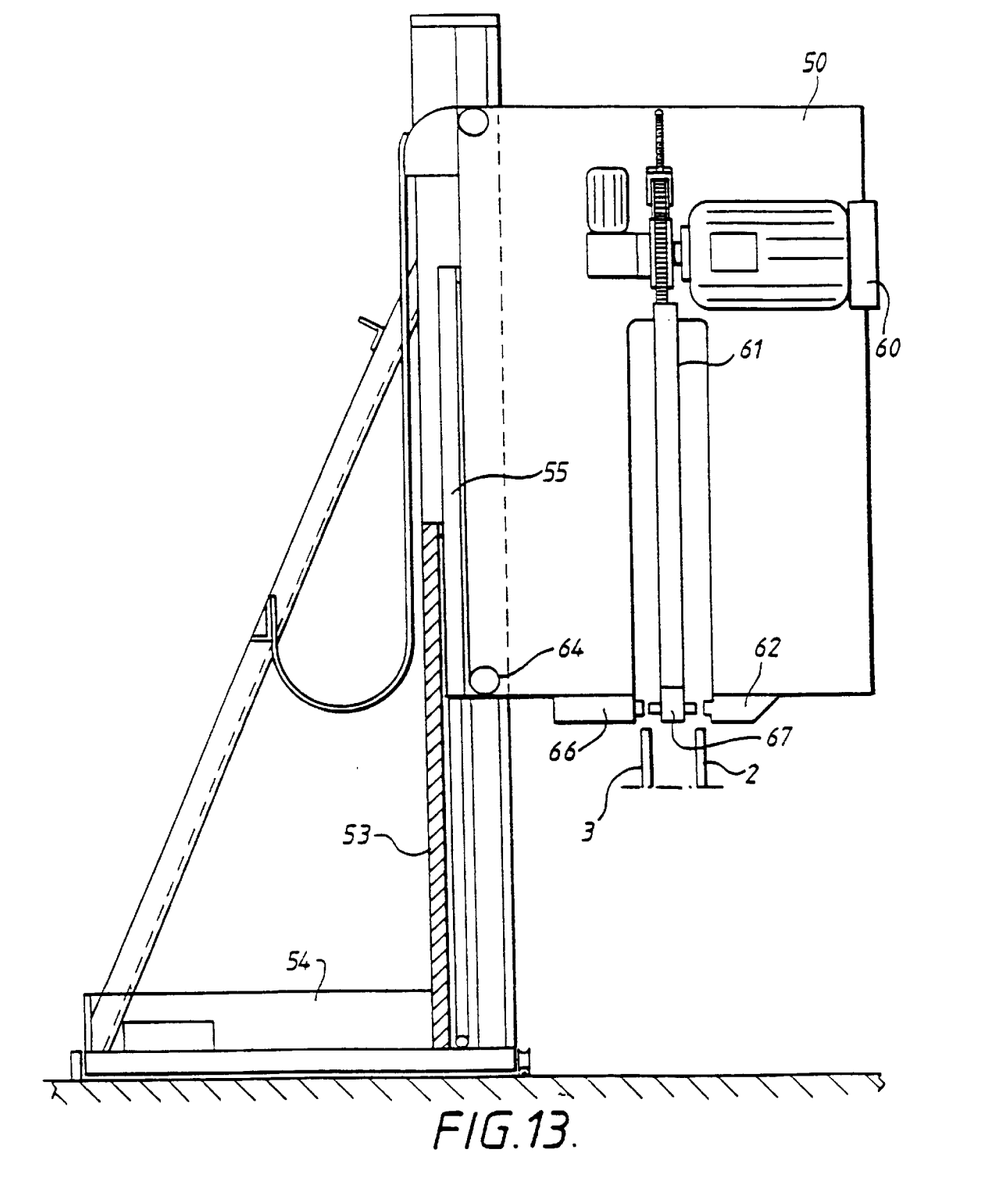
FIG. 13 is a side view of the apparatus illustrated in FIG. 12 taken in the direction of arrow A.

Turning now to FIGS. 12 and 13, the apparatus illustrated differs from that shown previously in that the steel facing plates 2, 3 are positioned vertically with the bars 1 being introduced to their required positions between the plates from above.

The apparatus includes a welding head carrier 50 guided by track rollers 64 which run in slots 52 milled into an upright 53 of a support structure 54. The carrier 50 is raised and lowered relative to the upright 53 by a hydraulic piston 55 and the support structure 54 includes track rollers 56 and profiled track rollers 57 which run over a rail 58 to enable the welding head to move parallel to the plates 2, 3. A counterweight 59 to the welding head carrier 50 is provided.

As will be seen more clearly from FIG. 13, the carrier 50 supports an electric motor 60 connected by a belt drive through an extension 61 to provide rotational drive to the welding head 67 located vertically between the plates 2, 3. The carrier 50 includes an adjustable anvil 62 formed with a hole through which bars 1 can be loaded sequentially for subsequent positioning between the plates prior to welding.

Guides 65 are provided to hold the plates in position prior to welding. These need to be slackened off when a weld is made.

In use, a bar is slid axially through the hole in anvil 62 such that it contacts the face of hydraulic piston 66. The position of hydraulic piston 66 is adjusted so that the bar is in the correct location for subsequent insertion between the plates. Piston 66 is then retracted to enable the weld head 67 to be moved downwardly between the plates 2,3 carrying bar 1 with it. As the carrier advances cams forming part of the welding head 67 act to move the plates apart such that the bar, which is longer than the finished plate separation, may be positioned. During the subsequent welding operation force is applied to the bar/plate interface by extending the hydraulic piston 66 to clamp the plates between the piston 66 and the anvil 62. Internal pistons forming part of the welding head 67 act to force each individual plate on to the piston 66 or anvil 62, thus holding the plates square and flat ready for welding. The weld force and/or displacement can be controlled by adjusting the pressure in hydraulic activator 66.

Completion of the double skin structure involves assembling the individual double skin composite panels and filling the voids between the face plates 2,3 with normal or lightweight concrete.

Welding of the bars 1 to the plates 2,3 may be effected by several welding processes, three of these being described below.

The first of these processes is resistance/pressure welding. In this process, the interface pressure between each bar 1 and the plates 2,3 is set to a predefined value. An electric current is then passed through the interface to heat the interface. As the metal heats, further electrical resistance is generated. Heating is allowed to continue until the interface temperature reaches a value suitable for forging at which stage pressure may be increased across the interface, causing plastic deformation as the heated area deforms. This forges a high quality weld. Alternatively, the entire process may take place at a constant force, forging occurring when the metal reaches the appropriate softening temperature.

In this process, the carrier 9 of FIG. 3 is electrically conducting and the bearing plate 22 (see FIG. 7) acts as the other electrode. By creating an electrical circuit between the bars 1 and the bearing plate 22, electric heating can be achieved across the interfaces between the rods 1 and the plates 2, 3. The force across these interfaces is controlled for optimum weld conditions. Once sufficient heat has been generated the pressure across the interface may be increased and forged welds effected. As mentioned previously, weld upset can be controlled by monitoring the displacement, thereby enabling a consistent distance to be maintained between the plates.

Weld parameters are controlled by adjusting the welding current and controlling the applied pressure and displacement.

The second process is laser welding in which a high power (eg 15 kW) laser source is located to the sides of the plates 2,3. Bars 1 are positioned between two facing plates and the laser beam is directed between the plates and reflected by a series of mirrors so as to traverse the interfaces between the bars and the plates, thus effecting welds. The beam is moved from one bar/plate interface to the next. Welding may be monitored by closed circuit television to ensure that penetration is achieved. High external pressure is applied across the interface during welding. Full fusion welding using the laser is not necessary in that the force and displacement control can be used to forge a weld once the metal is heated.

In this process the welding heads are replaced by a series of mirrors positioned to reflect the laser beam onto the selected weld interface between the bar 1 and plates 2,3. These mirrors move on a linear guide system to enable the laser beam to move across the interface. Solenoids or motion control motors are provided to switch the laser beam from top to bottom welds. To ensure clean weld surfaces the front of the tool carrier is fitted with a wire brush or similar cleaning system. This brush operates to clean the top and bottom plates 2,3 as the tool carrier 9 (see FIG. 3) is moved in and out of the gap between the plates.

The third process is friction welding in which each bar 1 is held between the plates in such a manner that it can be made to rotate or oscillate. Two pistons, one between the plates 2,3 and one outside, are adjusted in order to vary the contact pressure acting across the interface. As the bar rotates or oscillates contact pressure across the interface is controlled by retracting one piston at a predefined rate such that the interface heats at a pre-defined and rapid rate. After a pre-set time rotation is stopped and pressure increased. Very high levels of energy are concentrated at the weld interface melting and extruding surface oxides. A clean, high quality weld is therefore produced. Because the heating rate is so high, only a thin layer of metal is actually heated. The friction welding process is substantially self regulating thereby ensuring near identical weld conditions at each end of the bar. Weld quality is monitored by noting the final upset, the required forging pressure and the energy used to rotate the bar.

In this process the welding head comprises a device for transmitting rotational power to the bar. Two ways of transmitting rotational or reciprocating power are believed to be feasible, in the first of which each bar is driven from a flywheel designed to store energy. The flywheel is instrumented such t hat its rotational speed, and hence energy, is accurately known. To effect a weld the control-piston 23 of FIG. 9 is set to provide a gap across the bar/plate interface. The flywheel and bar system is then caused to rotate by an external power source (e.g's., electric motor, mechanical drive system). The system continues to gain rotational speed until a pre-specified speed is reached at which stage the drive power is disconnected. The control piston 23 is then advanced, causing the bar/plate interface to close. This generates frictional heating between the rotating bar 1 and stationary plates 2,3 as the energy from the flywheel is transferred to the weld zone. The rate of energy transfer is controlled by adjusting the control piston (e.g., varying the contact pressure) such that the rotational speed against time follows a predefined curve. At a predefined point on the curve the control piston switches from being controlled by rotational speed to advancing at a fixed rate. This raises the contact pressure rapidly, stops rotation and results in forging of the weld.

The second proposed way of transmitting rotational power is for the bar to be driven directly from a high torque device (e.g. a high power electric or hydraulic motor). The torque or power transferred to the bar is used to control the interface pressure such that a pre-defined torque curve is followed. At the specified time the power is cut and the torque device braked by the weld process. The interface pressured may be increased to forge the weld. The advance of the top plate 2 towards the bottom plate 3 is monitored and controlled.

After the welds have been made, the valves 15, 19, 26 of FIG. 7 are de-energised allowing the piston springs to retract the pistons. At this time, no interference forces exist between the tool carrier 9 and the plates 2,3. The plates can therefore be advanced, enabling the tool carrier to be withdrawn.

It will be appreciated that the foregoing is exemplary of apparatus and methods in accordance with the invention and that modifications can readily be made without departing from the true scope of the invention as set out in the appended claims.

I claim:

1. A method of sequentially welding a plurality of metallic cross-members in spaced rows to facing plates of a double skin composite panel with the longitudinal axis of each cross-member aligned substantially normal to the facing plates, the method including the steps of causing the facing plates to separate, positioning each cross-member in turn between the facing plates, applying a controlled clamping force to the inner and outer surfaces of each facing plate thereby to hold each facing plate substantially normal to the longituidinal axis of each cross-member and to place the inner surface of each facing plate in intimate contact with the respective end of a cross-member to be welded thereto, subjecting the interfaces between the ends of the cross-member and the facing plates to a welding operation, and controlling the force applied through the facing plates to each end of the cross-member during the course of the welding operation.

2. A method as claimed in claim 1 wherein the applied force is preset and maintained substantially constant during the welding operation.

3. A method as claimed in claim 1 wherein the applied force is varied in a controlled manner during the welding operation.

4. A method as claimed in claim 1 wherein each clamping force is applied to the respective facing plate by a bearing plate movable into contact with the outer surface of the respective facing plate at a location coincident with the position of one end of a cross-member located between the facing plates.

5. A method as claimed in claim 1 wherein the clamping forces are applied through a hydraulic system comprising a piston housed within a cylinder and movable to vary the force applied to the ends of the respective cross-member and each facing plate, the hydraulic fluid supply being controlled through control valves to maintain the applied force within required predetermined limits.

6. A method as claimed in claim 1 wherein each cross-member is positioned between the facing plates by a tool carrier of a height no greater than the length of each cross-member and operable to move each cross-member to its required position between the facing plates.

7. A method as claimed in claim 6 wherein a roller is positioned in advance of the tool carrier in contact with the inner surface of one of the facing plates, the roller being movable to increase the spacing between the facing plates.

8. A method as claimed in claim 1 wherein the clamping forces are applied to the inner surface of each facing plate by double-acting pistons mounted within cylinders formed in a cross-member carrying block movable to position each cross-member carried thereby to a required location between the facing plates, bearing plates being positioned in contact with the outer surface of each facing plate in positions immediately opposite the positions of the double-acting piston.

9. A method as claimed in claim 1 wherein the facing plates are supported substantially horizontally with the cross-members being introduced into the spacing between the plates from the side.

10. A method as claimed in claim 1 wherein each cross-member is located in a weld head supported by a carrier, each cross-member being positioned in its required location between the facing plates by movement of the weld head into the spacing between the facing plates.

11. A method as claimed in claim 10 wherein the carrier is movable substantially vertically between the facing plates.

12. A method as claimed in claim 10 or claim 11 wherein guides are provided to hold the plates in position prior to welding.

13. A method as claimed in claim 1 wherein the cross-members are welded to the facing plates by resistance/pressure welding.

14. A method as claimed in claim 1 wherein the cross-members are welded to the facing plates by laser welding.

15. A method as claimed in claim 1 wherein the cross-members are welded to the facing plates by friction welding.

16. A method as claimed in claim 15 wherein rotational movement is transmitted to each cross-member in turn by an energy storing flywheel.

17. A method as claimed in claim 15 wherein rotational movement is transmitted to each cross-member in turn by a high torque device.

18. A method as claimed in claim 17 wherein the high torque device comprises an electric or hydraulic motor.

* * * * *

UNITED STATES PATENT AND TRADEMARK OFFICE
CERTIFICATE OF CORRECTION

PATENT NO. : 5,773,783
DATED : JUNE 30, 1998
INVENTOR(S) : HUGH GORDAN BOWERMAN

It is certified that error appears in the above-identified patent and that said Letters Patent is hereby corrected as shown below:

Col. 7, line 37, delete "t hat", insert --that--

Col. 8, line 19, delete "longituidinal", insert --longitudinal--

Col. 9, line 8, delete "or claim 11"

Signed and Sealed this

Sixteenth Day of November, 1999

Attest:

Q. TODD DICKINSON

*Attesting Officer*   Acting Commissioner of Patents and Trademarks